United States Patent [19]

Ichikawa et al.

[11] Patent Number: 4,898,003
[45] Date of Patent: Feb. 6, 1990

[54] AUTOMOBILE AIR CONDITIONER

[75] Inventors: Toru Ichikawa, Kusatsu; Shuichi Kodama; Nobuo Kagoroku, both of Otsu; Shotaro Ito, Kurita; Shuichi Honda, Kusatsu, all of Japan

[73] Assignee: Matsushita Electric Industrial Co., Ltd., Osaka, Japan

[21] Appl. No.: 264,884

[22] Filed: Oct. 31, 1988

[30] Foreign Application Priority Data

Oct. 30, 1987 [JP] Japan ................. 62-276104
Oct. 30, 1987 [JP] Japan ................. 62-276105
Dec. 24, 1987 [JP] Japan ................. 62-328543

[51] Int. Cl.⁴ .............................................. B60H 1/32
[52] U.S. Cl. ................................ 62/244; 62/259.1; 98/2.11; 165/122
[58] Field of Search ................. 62/244, DIG. 16, 426, 62/419, 259.1; 98/2.11; 165/122

[56] References Cited

U.S. PATENT DOCUMENTS

| | | | |
|---|---|---|---|
| 2,151,097 | 3/1939 | Germonprez | 62/244 X |
| 2,929,229 | 3/1960 | Deturler | 62/426 |
| 3,524,328 | 8/1970 | Schuster | 165/122 X |
| 3,766,750 | 10/1973 | Aoh et al. | 62/419 X |
| 4,458,502 | 7/1984 | Adachi et al. | 62/DIG. 16 |
| 4,557,321 | 12/1985 | von Resch | 165/122 |
| 4,622,831 | 11/1986 | Grupa | 62/244 |
| 4,722,747 | 2/1988 | Armbruster | 98/2.11 X |

FOREIGN PATENT DOCUMENTS 63-22213 2/1988 Japan .
63-24011 2/1988 Japan .

Primary Examiner—William E. Tapolcai
Attorney, Agent, or Firm—Wenderoth, Lind & Ponack

[57] ABSTRACT

An automobile air conditioner which has a generally elongated casing having air intake and outlet grilles defined at opposite sides thereof, a generally elongated evaporator accommodated within the casing so as to extend generally parallel to the direction of elongation of the casing and positioned adjacent the air intake grille, at least one cross-flow fan accommodated within the casing so as to extend generally parallel to the direction of elongation of the casing and positioned between the evaporator and the air outlet grille, and a drive unit for driving the cross-flow fan in one direction for blowing air from the inlet grille to the air outlet grille. The evaporator is supported in position within the casing in a tilted fashion with its upper edge towards the cross-flow fan.

8 Claims, 7 Drawing Sheets

AUTOMOBILE AIR CONDITIONER

BACKGROUND OF THE INVENTION

1. Field of the Invention

The present invention generally relates to an air conditioner and, more particularly, to the air conditioner particularly suited for use in an automobile.

2. Description of the Prior Art

An automobile air conditioner of a type installed in the ceiling in the passenger s compartment of an automobile body structure is well known in the art and is disclosed in, for example, the Japanese Laid-open Utility Model Publications No. 63-22213 and No. 63-24011 published in 1988. According to these publications, the prior art automobile air conditioner employs a blower in the form of a centrifugal fan.

Where a centrifugal fan is employed for the blower, the assembly as a whole tends to be relatively bulky with no opportunity available for reducing the thickness thereof as measured from the ceiling down to the bottom of the assembly. As is well known to those skilled in the art, the blower assembly employing a centrifugal fan has a construction wherein air is sucked into the assembly in an axial direction along the shaft about with the fan rotates and is discharged from the circumference of the assembly radially outwardly, i.e., in a centrifugal direction. Therefore, drastic reduction of the diameter of the centrifugal fan is not possible.

In particular, the first mentioned Japanese publication discloses the disposition of the blower assembly with the fan shaft lying horizontal, i.e., generally parallel to the ceiling. The horizontal disposition of the fan shaft causes the fan casing for encasing the centrifugal fan to protrude downwards from the ceiling and into the interior of the automobile body structure through a distance corresponding to the diameter of the centrifugal fan.

Also, the width of the centrifugal fan as measured in a direction parallel to the fan shaft is considered to be an optimum value if it is generally equal to the radius of the centrifugal fan. Accordingly, where the blower assembly is installed with the fan shaft lying vertical, i.e., generally perpendicular to the ceiling, such as disclosed in the second mentioned Japanese publication, the blower assembly not only requires a width somewhat proportional to the diameter of the centrifugal fan, but also the disposition of a fan drive motor so as to be oriented in a direction parallel to the fan shaft. Because of these factors, the thickness of the blower assembly as measured from the ceiling down to the bottom of the blower assembly cannot be drastically reduced.

Considering now the layout of an automobile body structure in general, the height is generally limited from the standpoint of body aerodynamics, body stability, and other factors and/or by law and, therefore, it has long been considered a problem to reduce the bulkiness of the blower assembly in order for it to be installed inside the passenger's compartment.

Also, regardless of the type of the automobile air conditioner particularly suited for installation in the ceiling in the passenger's compartment, the apparatus is required to have a relatively high durability and rigidity in view of the fact that any automobile during running undergoes bumpy motions and tilts and that the apparatus is therefore subjected to severe vibrations.

SUMMARY OF THE INVENTION

The present invention is therefore intended to provide an improved automobile air conditioner having a drastically reduced thickness to permit it to be installed in the ceiling of the automobile body structure without substantially adversely affecting the aesthetic feature of the automobile interior finish.

Another important object of the present invention is to provide an improved automobile air conditioner of the type referred to above wherein as a blower at least one cylindrical fan generally known as a cross-flow fan is employed to accomplish the drastic reduction in thickness of the apparatus as a whole.

A further object of the present invention is to provide an improved automobile air conditioner of the type referred to above, which can satisfactorily withstand the severe vibrations and drastic changes in temperature.

The air conditioner according to the present invention employs not only the cross-flow fan, but also an evaporator. As is well known to those skilled in the art, an evaporator has an evaporator coil for the flow of a liquid medium therethrough and a number of evaporator fins for facilitating heat exchange between the liquid medium flowing through the evaporator coil and the air flowing through the air conditioner. Where the liquid medium is a coolant for cooling the air, the heat exchange results in formation of condensed water drops. Accordingly, the installation of the air conditioner in the ceiling of the automobile body structure requires utmost care to avoid any possible fall of the condensed water drops down onto the interior boot floor and, possibly, on some passengers occupying the seat.

Therefore, a still further object of the present invention is to provide an improved automobile air conditioner of the type referred to above, wherein means is provided to avoid the fall of the condensed water drops down onto the interior boot floor.

In order to accomplish these and other objects of the present invention, the present invention in one aspect provides an automobile air conditioner which comprises a generally elongated casing having air intake and outlet grilles defined at opposite sides thereof, a generally elongated evaporator accommodated within the casing so as to extend generally in the direction elongation of the casing and positioned adjacent the air intake grille, at least one cross-flow fan accommodated within the casing so as to extend generally in the direction of elongation of the casing and positioned between the evaporator and the air outlet grille, and a drive unit for driving the cross-flow fan in one direction from top to bottom as viewed from the air outlet grille. The evaporator is supported in position within the casing in a tilted fashion with its upper edge towards the cross-flow fan.

The use of the cross-flow fan for the blower and the tilted support of the evaporator make it possible to reduce the thickness of the automobile air conditioner as a whole, which thickness is as measured from the ceiling down to the bottom of the apparatus in a direction of height of the automobile body. Also, since the cross-flow fan is so supported as to be rotated from top to bottom as viewed from the air outlet grille and, at the same time, the evaporator is supported with its upper edge towards the cross-flow fan, a smooth flow of air through the cross-flow fan can be advantageously attained to such an extent that not only can a sufficient flow of air be secured, but any possible generation of noise resulting from the flow of air can also be minimized.

According to another aspect of the present invention, the generally elongated casing of the automobile air conditioner of the above described construction is shaped and curved so as to have a portion intermediate levels of thereof raised to a level higher than the levels of the opposite ends of the casing.

The curved feature advantageously permits the air conditioner casing not only to follow the curvature of the ceiling when the air conditioner is installed on the ceiling, but also to exhibit an increased physical strength.

According to a third aspect of the present invention, the evaporator supported within the casing is shaped and curved so as to follow the curvature of the casing. With this feature, the evaporator may serve as a frame structure for the casing and, therefore, the rigidity and the resistance of the casing as a whole to vibrations can be advantageously increased. Moreover, the employment of the curved evaporator results in an increase of the total surface area of contact thereof with air which in turn increases the heat exchange efficiency.

According to a fourth aspect of the present invention, the automobile air conditioner is further provided with a drain duct defined in the casing immediately beneath the evaporator with a lower edge of the evaporator protruding into the drain duct. The drain duct is communicated at its opposite ends with drain ports for fluid connection with external drain pipes.

The provision of the drain duct having the drain ports at the opposite ends thereof ensures that condensed water drops can be positively drained outside the casing through the external drain pipes regardless of the direction of tilt of the automobile during running. Where the air conditioner casing is curved as hereinbefore discussed, the drainage of the condensed water drops by the effect of gravitational force takes place even when the automobile is parked.

According to a fifth aspect of the present invention, there is provided an automobile air conditioner which comprises a generally elongated casing having air intake and outlet grilles defined at opposite sides thereof, a generally elongated evaporator supported in tilted fashion within the casing and so curved as to follow the curvature of the casing, a pair of cross-flow fans accommodated within the casing in end-to-end fashion so as to extend generally in the direction of elongation of the casing and positioned between the evaporator and the air outlet grille, and a drive motor or driving each of the cross-flow fans. The casing is shaped and curved so as to have a portion intermediate the length thereof raised to a level higher than the level of the opposite ends of the casing and, at the same time, the evaporator supported within the casing is so shaped and so curved as to follow the curvature of the casing, the two drive motors are positioned intermediate the length of the casing and are drivingly coupled with the cross-flow fans positioned on respective sides of the drive motors.

In this automobile air conditioner according to the fifth aspect of the present invention, the use of the cross-flow fan for the blower and the tilted support of the evaporator make it possible to reduce the thickness of the automobile air conditioner as a whole. Also, since the casing is so shaped and so curved as to have a portion intermediate the length thereof raised to a level higher than the level of the opposite ends of the casing, not only can the air conditioner casing follow the curvature of the ceiling when the air conditioner is installed on the ceiling, but it can also exhibit an increased physical strength particularly in a direction widthwise of thereof.

Also, since the evaporator supported within the casing is so shaped and so curved as to follow the curvature of the casing, not only can the rigidity and the resistance of the casing as a whole to vibrations be advantageously increased, but also the total surface area of contact thereof with air can be increased which in turn increases the heat exchange efficiency. Furthermore, since the drive motors which are relatively heavy and have a substantial weight altogether are mounted intermediate the length of the casing, any possible deformation of the casing which would otherwise result from vibration can be advantageously avoided.

According to a sixth aspect of the present invention, the automobile air conditioner according to the fifth aspect of the present invention may be provided with a drain duct defined in the casing immediately beneath the evaporator with a lower edge of the evaporator protruding into the drain duct. The drain duct is communicated at its opposite ends with drain ports for fluid connection with external drain pipes.

According to a seventh aspect of the present invention, there is provided an automobile air conditioner system which comprises an interior air conditioner comprising a generally elongated casing having air intake and outlet grilles defined at opposite sides thereof and secured to the ceiling in a passenger's compartment of an automobile body structure, said casing being so shaped and so curved as to have a portion intermediate the length thereof raised to a level higher than the level of the opposite ends of the casing, a generally elongated evaporator supported in tilted fashion within the casing and so curved as to follow the curvature of the casing, at least one cross-flow fan accommodated within the casing so as to extend generally in to the direction of elongation of the casing and positioned between the evaporator and the air outlet grille, and a drive unit for driving the cross-flow fan. The system also comprises an exterior unit positioned inside an engine space of the automobile body structure and including a condenser and a compressor, said evaporator in the interior air conditioner being fluid-connected with the exterior unit.

In this automobile air conditioner according to the seventh aspect of the present invention, the use of the cross-flow fan for the blower and the tilted support of the evaporator make it possible to reduce the thickness of the automobile air conditioner as a whole. Also, since the casing is so shaped and so curved as to have a portion intermediate the length thereof raised to a level higher than the level of the opposite ends of the casing, not only can the air conditioner casing follow the curvature of the ceiling when the air conditioner is installed on the ceiling, but it can also exhibit an increased physical strength particularly in a direction widthwise of thereof.

Also, since the evaporator supported within the casing is so shaped and so curved as to follow the curvature of the casing, not only can the rigidity and the resistance of the casing as a whole to vibrations be advantageously increased, but also the total surface area of contact thereof with air can be increased which in turn increases the heat exchange efficiency. Furthermore, since the air conditioner is so supported to the ceiling of the automobile body structure with the air outlet grille facing towards a rear seat, one or more passengers sitting on the rear seat can be placed in a comfortable position.

BRIEF DESCRIPTION OF THE DRAWINGS

These and other objects and features of the present invention will become clear from the following description of preferred embodiments thereof and with reference to the accompanying drawings, in which.

DETAILED DESCRIPTION OF THE EMBODIMENTS

Figure 1:
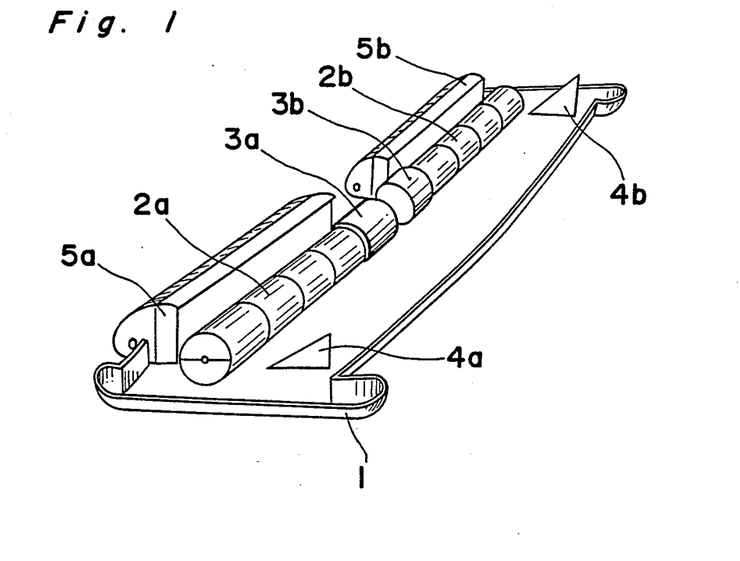
FIG. 1 is a perspective view of an upper casing half, turned upside down, of an automobile air conditioner according to a first preferred embodiment of the present invention.
Figure 2:
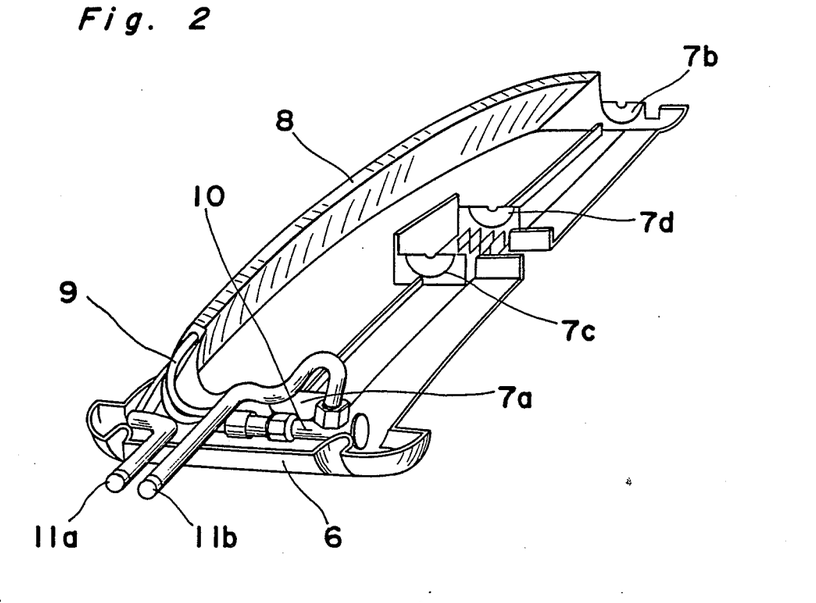
FIG. 2 is a perspective view of a lower casing half of the automobile air conditioner of the embodiment of FIG. 1.

An automobile air conditioner according to a first preferred embodiment of the present invention comprises a generally elongated and flattened casing 1 including upper and lower casing halves 2 and 6 which are best shown in FIGS. 1 and 2. Referring first to FIG. 1 showing the upper casing half 2 turned upside down, two cross-flow fans 2 a and 2b and respective fan drive motors 3a and 3b for driving the cross-flow fans 2a and 2b are mounted on the upper casing half 2. The upper casing half 2 has an inner surface (or an upper surface as viewed in FIG. 1) having integrally formed evaporator support ribs 5a and 5b and also has an exit grille structure provided with a stabilizer and a deflector blade for adjusting the direction of flow of cooled air as will be described later, said exit grille structure extending widthwise of the elongated casing 1.

Referring to FIG. 2 showing the lower casing half 6, the lower casing half 6 has an inner surface with integrally formed fan support ribs 7a to 7d and also has a generally curved evaporator 8 mounted thereon. The evaporator is of any known construction including an evaporator coil and a plurality of evaporator fins, said evaporator coil being fluid-coupled with connection ports 11a and 11b with an expansion valve disposed thereon. It is to be noted that of the fan support ribs 7a to 7d the fan support ribs 7a and 7b have integrally formed evaporator support ribs for the support of opposite end portions of the evaporator 8.

Hereinafter, the manner by which the automobile air conditioner of the above described construction is secured to the ceiling in a passenger's compartment of an automobile body structure will be described.

In the first place, the cross-flow fans 2a and 2b and the respective drive motors 3a and 3b are fitted to the upper casing half 1. The upper casing half 1 is then secured to the ceiling by the use of any suitable fastening means such as, for example, set bolts, with the cross-flow fans 2a and 2b oriented downwards towards the passenger's compartment. Subsequently, the evaporator 8 is mounted on the lower casing half 6, followed by the mounting of the lower casing half 6 on the upper casing half 1 from below so that the opposite end portions of the evaporator 8 can be engaged respectively with the evaporator support ribs 4a and 4b. At this time, the cross-flow fan 2a is disposed and supported between the fan support ribs 7a and 7d whereas the cross-flow fan 2b is disposed and supported between the fan support ribs 7a and 7c. At the same time, the fan drive motors 3a and 3a are disposed and supported between the fan support ribs 7c and 7d.

Figure 3:
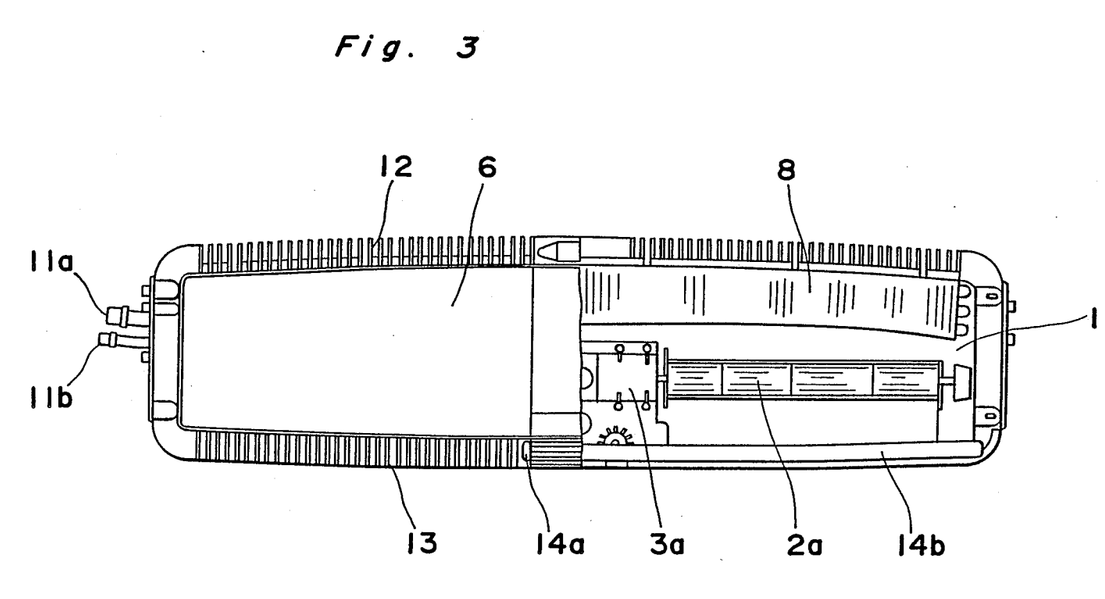
FIG. 3 is a op plan view, with a portion cut away, of the automobile air conditioner of FIG. 1.

FIG. 3 is a plan view, with a portion cut away, of the automobile air conditioner according to the first embodiment of the present invention as viewed from below. As shown therein, the generally elongated flattened casing 1 has air intake and outlet grilles 12 and 13 defined at respective opposite sides thereof. Reference numeral 14a represents a blow direction adjusting knob which, when manipulated, rotates deflector blade 14b for deflecting the air current up and down.

Figure 4:
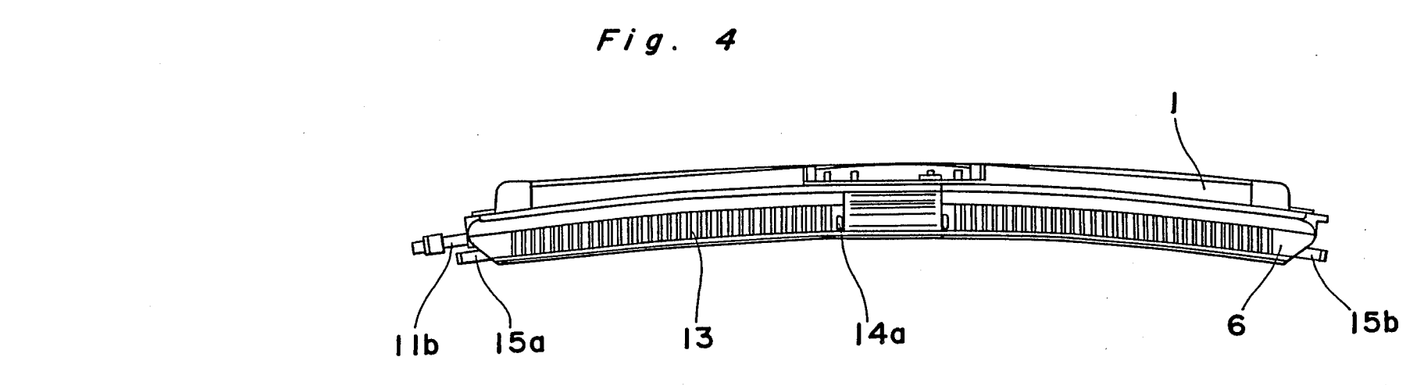
FIGS. 4 and 5 are front and rear elevational views, respectively of the automobile air conditioner of FIG. 1.
Figure 5:
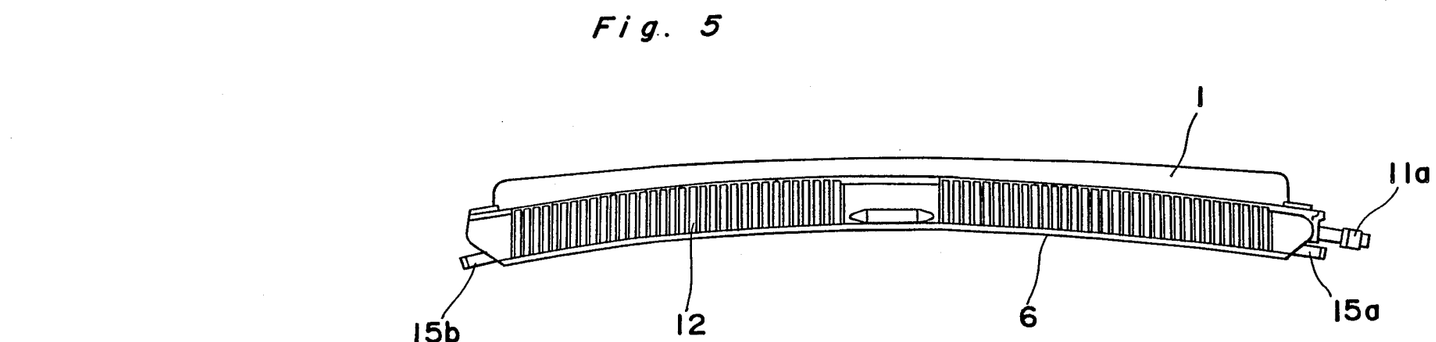

FIGS. 4 and 5 illustrate the automobile air conditioner as viewed from the exit grille 13 and from the intake grille 12, respectively. As shown therein, a portion of the casing 1 intermediate the length thereof is raised to a level higher than the level of the opposite ends of the casing 1. In other words, the casing 1 comprised of the upper and lower casing halves 2 and 6 is so curved as to follow the curvature of the ceiling or a roof panel of the automobile body structure. Reference numerals 15a and 15b shown therein designate respective drain ports.

Figure 6:
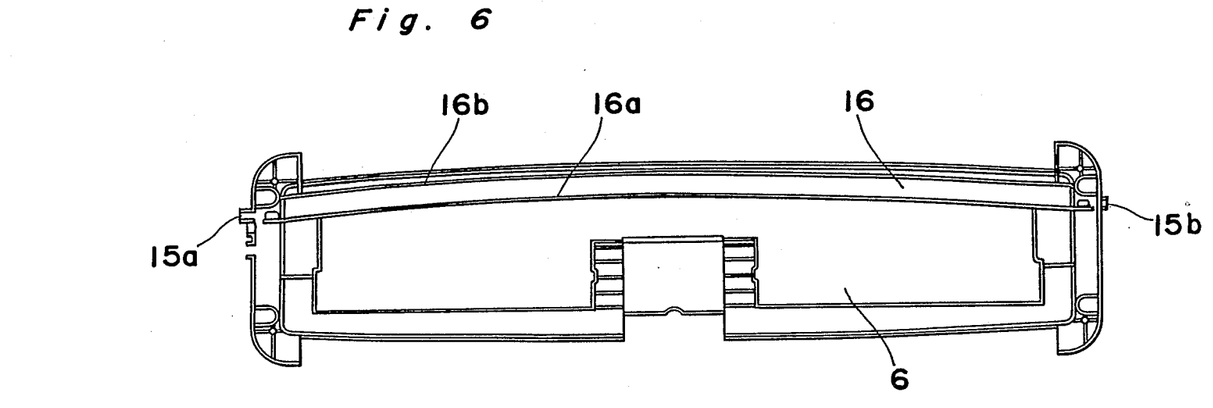
FIG. 6 is a top plan view of the lower casing half thereof.
Figure 7:
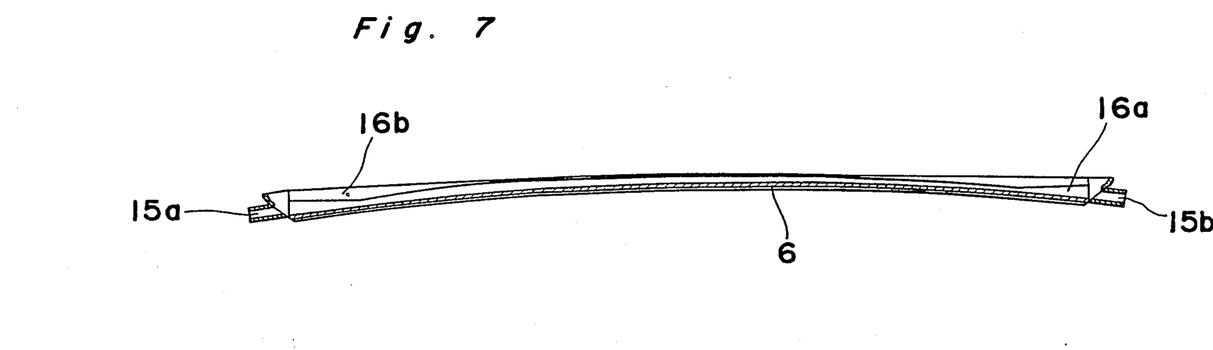
FIG. 7 is a longitudinal sectional view of the lower casing half thereof.

FIG. 6 is a top plan view of the lower casing half 6. As shown therein, the lower casing half 6 is formed with parallel ribs 16a and 16b extending lengthwise of the lower casing half 6 in spaced relation with each other an positioned inwardly adjacent the air intake grille. The parallel ribs 16a and 16b cooperate with each to define a drain duct 16 therebetween, said drain duct 16 having its opposite ends communicated with the drain ports 15a and 5b as shown in FIGS. 6 and 7. It is to be noted that FIG. 7 is a longitudinal sectional view of the lower casing half 6 showing the details of the drain duct 16.

Figure 8:
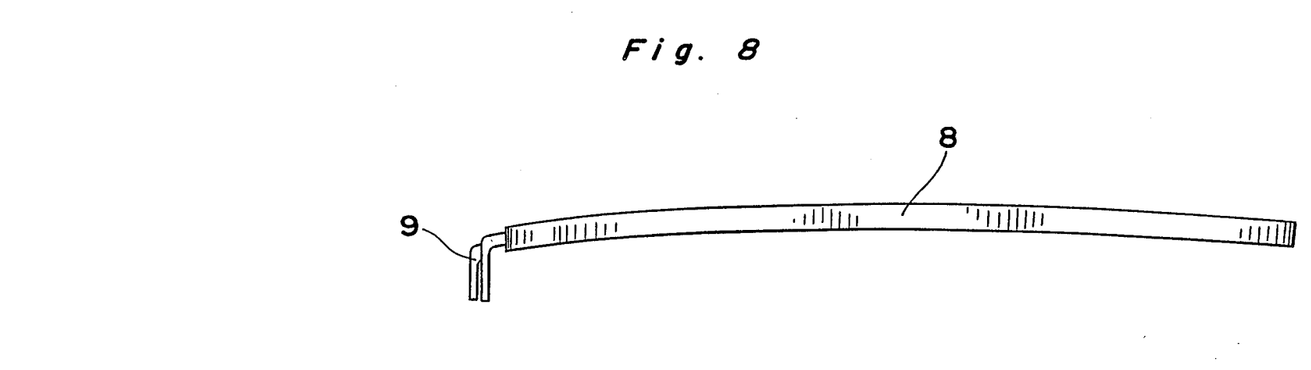
FIG. 8 is a top plan view of an evaporator used in the air conditioner of FIG. 1.

FIG. 8 is a top plan view of the evaporator 8. As shown therein, the evaporator 8 is curved to follow the inner surface of the casing.

Figure 9:
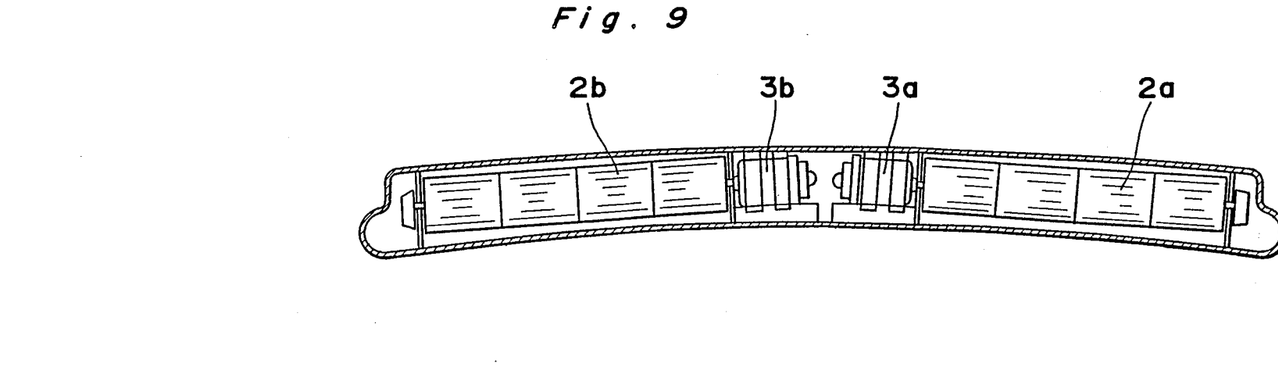
FIG. 9 is a longitudinal sectional view of an air conditioner according to the invention showing two cross-flow fans.

FIG. 9 is a longitudinal sectional view of the automobile air conditioner showing the disposition of the cross-flow fans 2a and 2b. As shown therein, the fan drive motors 3a and 3b are mounted on a portion of the lower casing half 6 intermediate the length thereof in symmetrical relationship with each other. The cross-flow fans 2a and 2b are drivingly coupled with the drive motors 3a and 3b, respectively. It is to be noted that, since the casing 1 has the intermediate portion positioned at a level higher than the level of the opposite ends thereof, the cross-flow fans 2a and 2b extending in respective directions away from each other are slightly inclined downwards away from the associated drive motors 3a and 3b.

Figure 10:
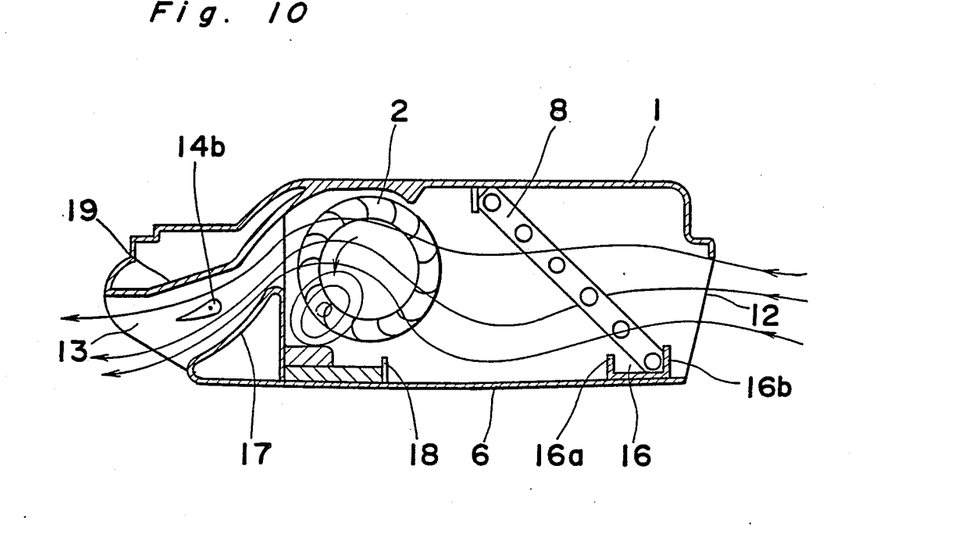
FIG. 10 is a schematic transverse sectional view of the air conditioner according to the invention.

FIG. 10 is a schematic side sectional view of the automobile air conditioner according to the first preferred embodiment of the present invention. As shown therein, the automobile air conditioner comprises a first stabilizer 17 integrally formed with the upper casing half 1, a second stabilizer 18 integrally formed with the lower casing half 6 and a diffuser 19. The first stabilizer 17 has a cross-sectional shape generally similar to the shape of a right triangle wherein the hypotenuse is occupied by a downwardly inclined wall extending downwardly from an apex portion adjacent the cross-flow fan 2 towards the exit grille 13. The first and second stabilizers 17 and 18 serve to stabilize forced eddy currents of air which would otherwise affect the flow of forced air produced by the cross-flow fan 2. Accordingly, the first stabilizer 17 is positioned on a downstream side of a vertical plane containing the axis of rotation of the cross-flow fan 2 with respect to the direction of flow of the forced air, whereas the second stabilizer 18 is positioned on an upstream side of the vertical plane containing the axis of rotation of the cross-flow fan 2. The diffuser 19 extends so as to be flared outwardly thereby to form an air exit region in cooperation with the wall of the first stabilizer 17 which extends from the apex portion thereof down to the exit grille 13.

Hereinafter, the operation of the automobile air conditioner resulting from the above described construction will be described.

By employing the cross-flow fans 2a and 2b as a blower, and by causing the evaporator 8 to be inclined, the thickness of the casing as measured in a direction heightwise of the automobile body structure can be reduced. Also, by placing the intermediate portion of the casing at a level higher than the level of the opposite ends thereof and, at the same time, curving the evaporator 8, and by dividing the cross flow fan into the two fans, the thickness of the casing can further be reduced. Since, by causing the casing to be curved, the casing can follow the curvature of the ceiling inside the automobile body structure, the thickness reducing effect can be enhanced.

Moreover, since the exit grille 13 can be formed, elongated in a widthwise direction, a relatively wide current of forced air emerging from the exit grille 13 can be obtained to provide a comfortable environment in the passenger compartment.

Although a problem associated with the strength will occur if the air conditioner is flattened and widened as hereinabove described, the present invention is substantially free from such a problem since the duct defining ribs 16a and 16b are formed so as to extend in the widthwise direction and, also, the evaporator 8 concurrently serves as a frame for the casing thereby to increase the rigidity of the casing in a direction widthwise thereof.

Yet, since the evaporator 8 is so curved as to follow the casing, any possible gap between the evaporator 8 and the casing can be substantially eliminated and, also, since the total contact surface area of the evaporator 8 itself can be increased, an increased heat-exchange efficiency can be obtained.

Also, since the intermediate portion of the lower casing half 6 is raised relative to the opposite ends thereof and the lower casing half 6 is provided with the drain ports 15a and 15b at respective ends thereof, water components can be positively drained either from the drain port 15a or the drain port 15b when the air conditioner tilts incident to the tilt of the automobile during running.

As shown in FIG. 10, the cross-flow fan 2 is adapted to be driven in a direction from top to bottom as viewed from the exit grille 13, i.e., counterclockwise about the axis of rotation thereof as viewed in FIG. 10. At the same time, the evaporator 8 is so supported and so inclined with an upper edge thereof towards the cross-flow fan. Therefore, not only can a smooth flow of air towards the cross-flow fan 2 as shown by the arrow-headed lines be accomplished, but a substantial flow of air can also be obtained while the generation of noises resulting from the flow of the forced air can also be minimized.

Yet, since the drive motors 3a and 3b which have a substantial weight are mounted intermediate the casing 1, any possible deformation of the casing resulting from the vibration can be avoided.

Figure 11:
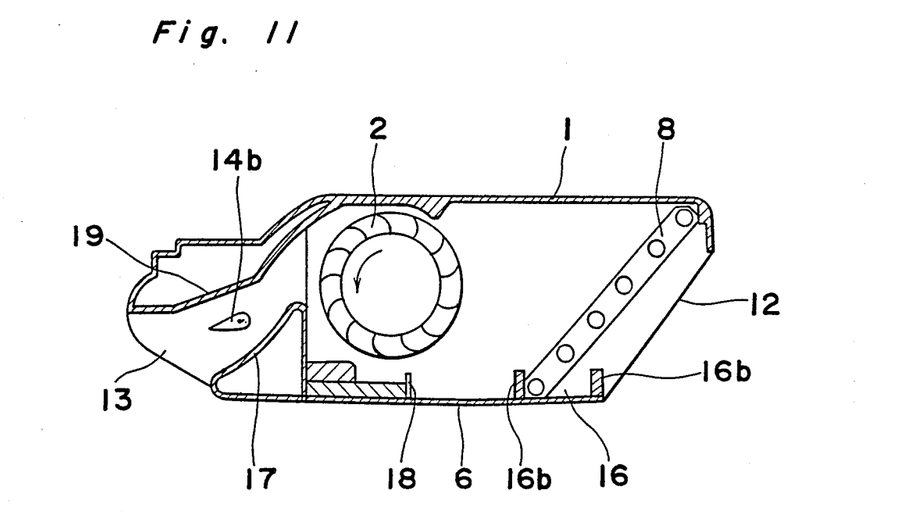
FIG. 11 is a view similar to FIG. 10, showing another preferred embodiment of the present invention.

FIG. 11 illustrates another preferred embodiment of the present invention. According to the embodiment shown in FIG. 11, the evaporator 8 is so supported and so inclined within the casing with its upper edge is positioned remote from the cross-flow fan 2 as compared with the lower edge. With this arrangement, the opening of the casing which defines the air intake grille 12 can be allowed to lie in a plane confronting generally downwardly and towards a rear seat in the automobile body structure.

The air conditioner according to the present invention which has the above described construction is installed in the automobile in the following manner which will now be described with reference to FIG. 12.

Figure 12:
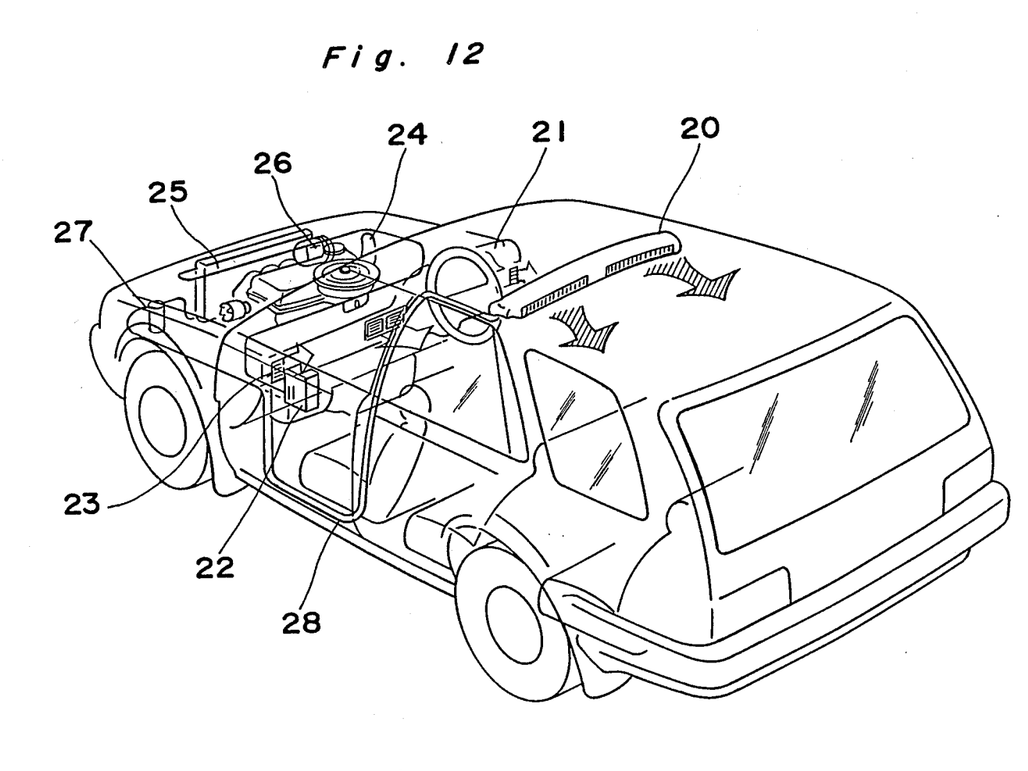
FIG. 12 is a schematic perspective view of an automobile body structure equipped with the air conditioner according to the present invention.

Referring now to FIG. 12, an indoor air conditioner unit 20 which has been described in connection with the foregoing embodiments is secured to the ceiling in the automobile body structure, particularly, an undersurface of the roof panel thereof, with the intake grille oriented towards a dashboard 32. An exit grille 23 of another indoor air conditioner unit having an evaporator 22 and a blower (not shown) is installed inside the dashboard 21. Within an engine room 24, a condenser 25, a compressor 26 and a dryer receiver 27 are installed and are communicated with the evaporator of the indoor air conditioner unit 20 and the evaporator 22 of such another indoor air conditioner unit by way of piping 28.

By the provision of the indoor air conditioner unit 20 and the other indoor air conditioner unit arranged in the manner as shown in FIG. 12, the indoor air conditioner unit 20 and the other indoor air conditioner unit can be used for providing conditioned air towards the rear seat and the front seat, respectively, within the automobile body structure. Particularly, where the indoor air conditioner units are simultaneously operated, a continued stream of conditioned air can be attained extending from the dashboard 21 towards a rear window along the ceiling of the automobile body structure. Specifically, when the cooling air flows along the ceiling where a substantial amount of radiant heat builds up, the interior of the automobile can be substantially uniformly air-conditioned quickly.

Although the present invention has fully been described in connection with the preferred embodiments thereof with reference to the accompanying drawings, it is to be noted that various changes and modifications will be apparent to those skilled in the art. By way of example, although in the foregoing embodiments the upper and lower casing halves 2 and 6 have been described as curved, at least one of the upper and lower casing halves 2 and 6 may be flat. Even with this alternative design, the thickness of the device as a whole can be advantageously reduced. In such case, instead of the use of two fan drive motors, one fan drive motor may be installed adjacent one end of the casing for driving both of the cross-flow fans. Also, instead of the use of two fan drive motors, one drive motor having a single drive shaft extending in opposite directions away from each other through the body of the motor may be employed and may be installed intermediate the length of the casing for driving both of the cross-flow fans.

Also, instead of the use of the parallel ribs 16a and 16b used to define the drain duct 16, the drain duct 16 may be defined in the form of a generally elongated recess formed in the lower casing half 6.

Accordingly, such changes and modifications are to be understood as included within the scope of the present invention as defined by the appended claims unless they depart therefrom.

What is claimed is:

1. An automobile air conditioner which comprises:
   a generally elongated casing having air intake and outlet grilles defined along the longer opposite sides thereof;
   a generally elongated evaporator accommodated within the casing so as to extend generally parallel to the direction of elongation of the casing and positioned adjacent the air intake grille;
   at least one cross-flow fan accommodated within the casing so as to extend generally parallel to the direction of elongation of the casing and positioned between the evaporator and the air outlet grille; and
   a drive unit for driving the cross-flow fan in a direction for blowing air through said casing from the air inlet grille to the air outlet grille, said evaporator being supported in position within the casing in a tilted fashion with its upper edge towards the cross-flow fan.

2. The air conditioner as claimed in claim 1, wherein the generally elongated casing is shaped and curved so to have a portion intermediate the length thereof raised to a level higher than the level of the opposite ends of the casing.

3. The air conditioner as claimed in claim 2, wherein the evaporator is so shaped and so curved as to follow the curvature of the casing.

4. The air conditioner as claimed in claim 2, further comprising a drain duct defined in the casing immediately beneath the evaporator with a lower edge of the evaporator protruding into the drain duct, said drain duct having at its opposite ends drain ports for fluid connection with external drain pipings.

5. An automobile air conditioner as claimed in claim 1 in which said at least one cross-flow fan has a diameter only slightly less than the thickness of said casing and extending substantially the entire length of said casing other than the portion occupied by said drive unit, whereby substantially the entire cross section of said casing from said inlet grille to said outlet grille is occupied by said cross-flow fan.

6. An automobile air conditioner which comprises:
   a generally elongated casing having air intake and outlet grilles defined along the longer opposite sides thereof;
   a generally elongated evaporator supported in tilted fashion within the casing and so curved as to follow the curvature of the casing;
   a pair of cross-flow fans accommodated within the casing in end-to-end fashion so as to extend generally parallel to the direction of elongation of the casing and positioned between the evaporator and the air outlet grille; and
   a drive motor for driving each of the cross-flow fans, said casing being shaped and curved so as to have a portion intermediate the length thereof raised to a levl higher than the level of the opposite ends of the casing and, at the same time, the evaporator supported within the casing being so shaped and so curved as to follow the curvature of the casing, said two drive motors being positioned intermediate the length of the casing and drivingly coupled with the cross-flow fans positioned laterally of the drive motors.

7. The air conditioner as claimed in claim 6, further comprising a drain duct defined in the casing immediately beneath the evaporator with a lower edge of the evaporator protruding into the drain duct, said drain duct having at its opposite ends drain ports for fluid connection with external drain pipings.

8. An automobile air conditioner which comprises:
   an interior air conditioner comprising a generally elongated casing having air intake and outlet grilles defined along the longer opposite sides thereof and adapted to be secured to the ceiling in a passenger's compartment of an automobile body structure, said casing being so shaped and so curved as to have a portion intermediate the length thereof raised to a level higher than the level of the opposite ends of the casing, a generally elongated evaporator supported in tilted fashion within the casing and so curved as to follow the curvature of the casing, at least one cross-flow fan accommodated within the casing so as to extend generally parallel to the direction of elongation of the casing and positioned between the evaporator and the air outlet grille, and a drive unit for driving the cross-flow fan; and
   an exterior unit adapted to be positioned inside an engine space of the automobile body structure and including a condenser and a compressor, said evaporator in the interior air conditioner being fluid-connected with the exterior unit.

* * * * *